W. G. BUCK.
FRICTION TRANSMISSION MECHANISM.
APPLICATION FILED SEPT. 5, 1914.
1,168,057.
Patented Jan. 11, 1916.
3 SHEETS—SHEET 3.
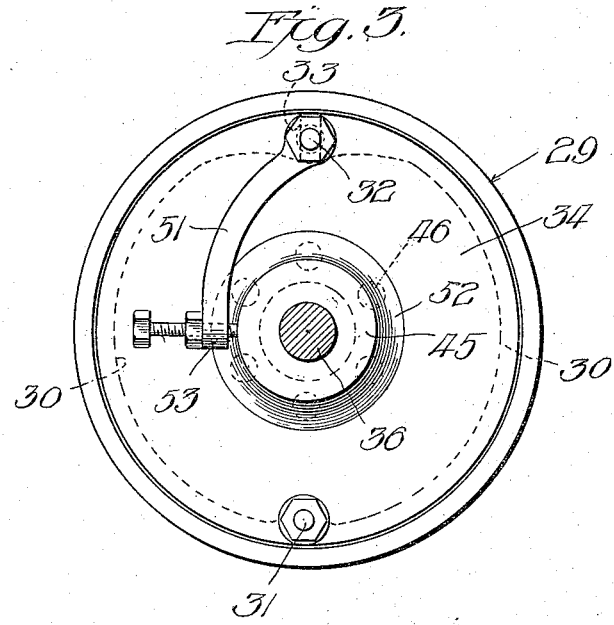
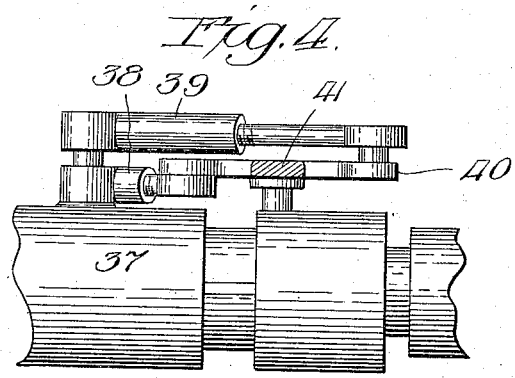

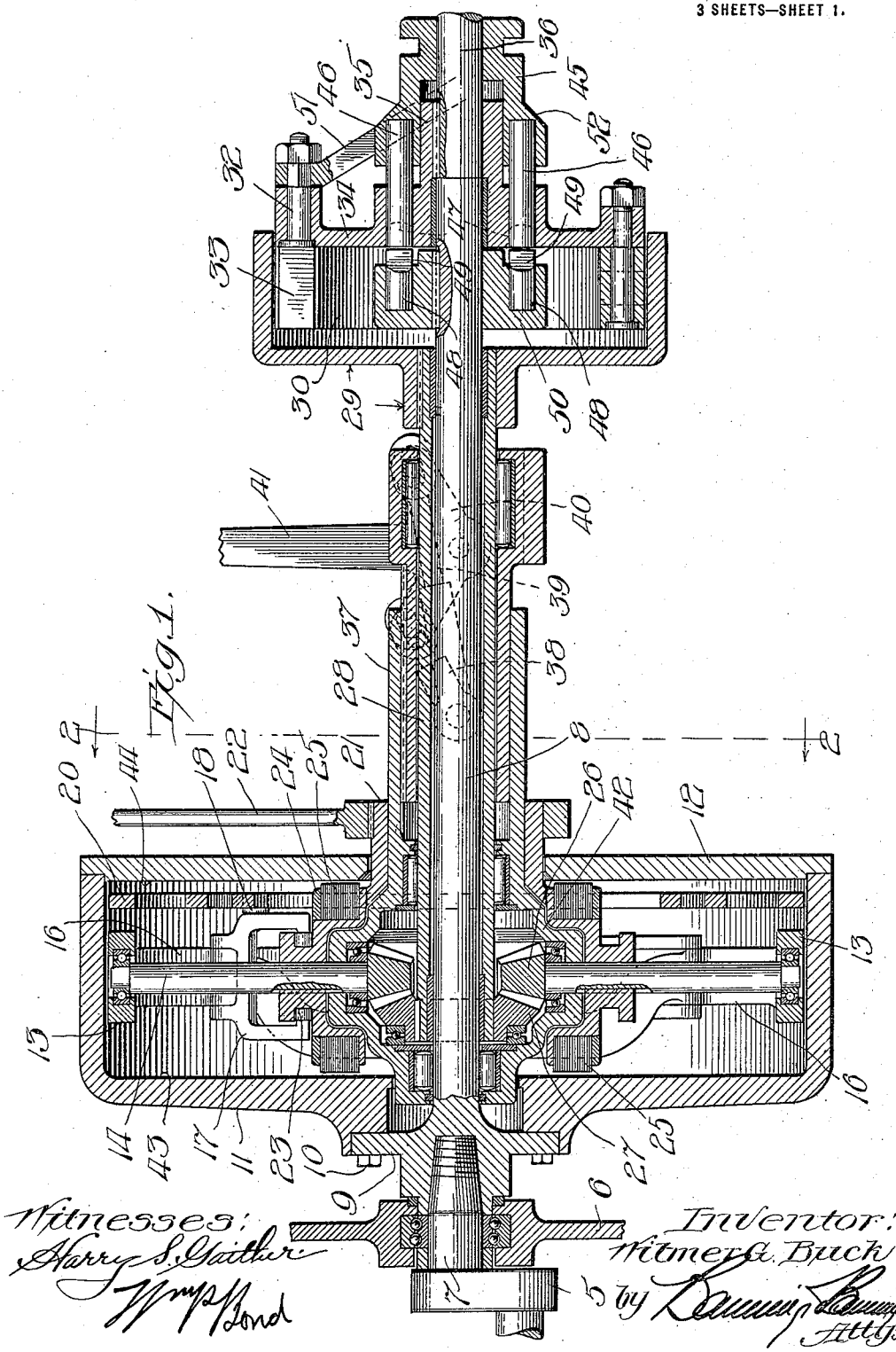

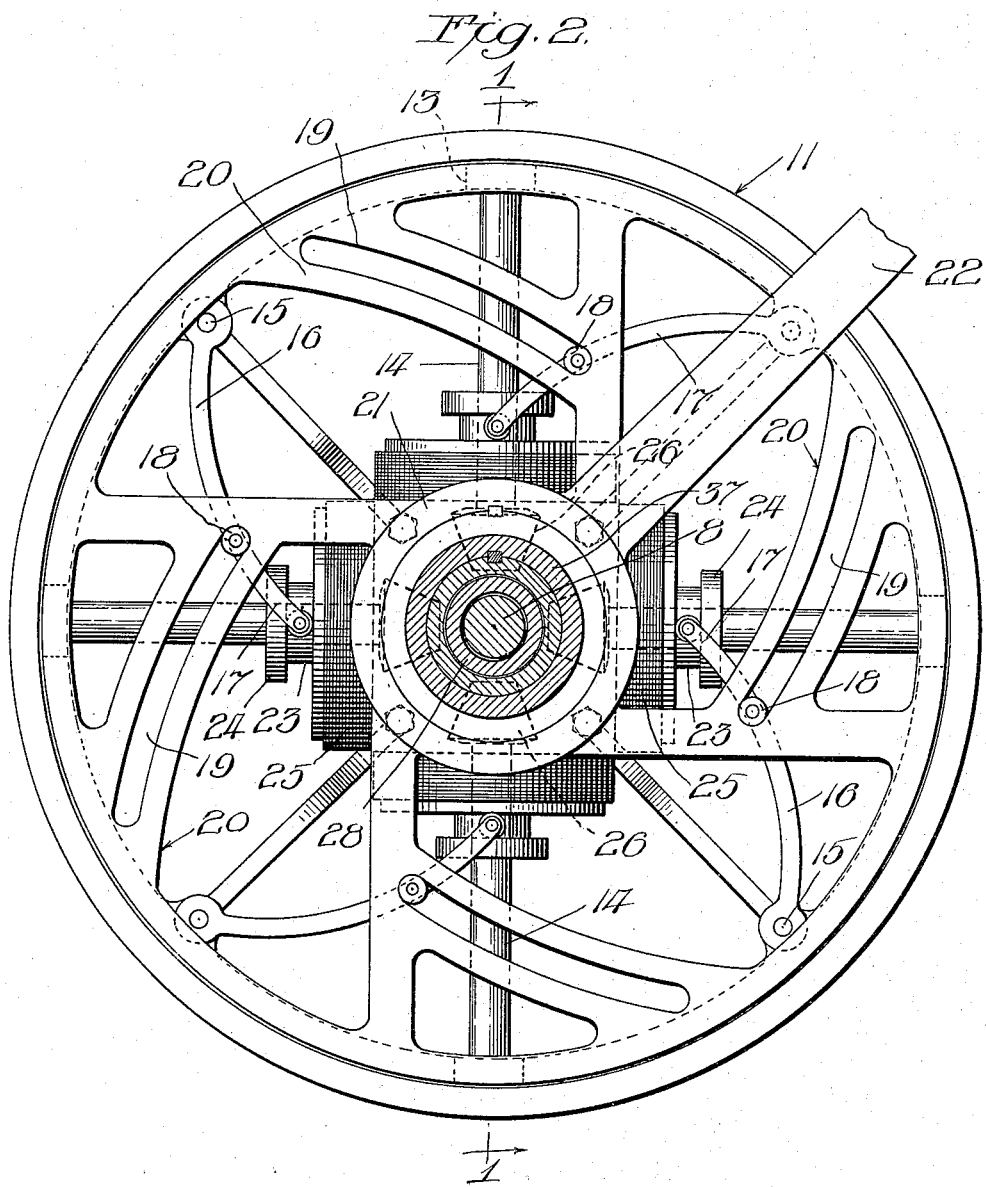

UNITED STATES PATENT OFFICE.

WILMER G. BUCK, OF WARREN, OHIO.

FRICTION TRANSMISSION MECHANISM.

1,168,057.  Specification of Letters Patent.  Patented Jan. 11, 1916.

Application filed September 5, 1914. Serial No. 860,363.

*To all whom it may concern:*

Be it known that I, WILMER G. BUCK, a citizen of the United States, residing at Warren, in the county of Trumbull and State of Ohio, have invented certain new and useful Improvements in Friction Transmission Mechanisms, of which the following is a specification.

The present invention relates to a friction transmission mechanism for transmitting power from a driving to a driven shaft.

The objects of the invention are; to provide means whereby a direct drive can be effected from the driving to the driven shafts; to provide means for securing a differential drive of the driven shaft; to provide means for securing a reverse drive of the driven shaft; and to provide an auxiliary mechanism for transmitting movement from the friction transmission to the driven shaft and for establishing a direct drive between the driving and driven shafts.

A further object of the invention is to provide lever mechanisms for operating the various portions of the transmission mechanism which will be conveniently and centrally located.

The invention further consists in the features of construction and combinations of parts hereinafter described and claimed.

In the drawings: Figure 1 is a sectional view of the device of the present invention; Fig. 2 is a section on line 2—2 of Fig. 1 looking in the direction of the arrow; Fig. 3 is an end view of the auxiliary clutch device; and Fig. 4 is a detail showing the link connection for actuating certain portions of the transmission mechanism.

In motor devices it is essential to a practical transmission that a direct driving be established when desired. The primary object of the invention is to effect this direct drive, although, of course, invention and novelty are claimed for other portions thereof.

Referring now to the drawings, and particularly to Fig. 1, a portion of an ordinary engine crank 5 is shown attached to which is the ordinary fly wheel 6 and connected to the end 7 of this crank is the drive shaft 8, which is provided with a flange 9 connected by suitable fastening means 10 to a housing 11. The housing, as shown, is of two parts, the separable portion being indicated by the numeral 12. Located within this housing is a ring 13, and at various intervals there is mounted in this ring radially extending stems 14, which may be of any desired number. As shown in Fig. 1, these stems are mounted to revolve axially within said ring. Pivoted to this ring 13, as at 15, Fig. 2, are a series of arms 16, which, as shown, are curvilinear in formation. Each of these arms terminates in a forked end 17, as shown in Fig. 1, and extending sidewise from this forked end is a roller 18, Figs. 1 and 2, which travels in a curvilinear slot 19 formed in a webbed ring 20.

Extending from the webbed ring 20 is a collar or sleeve 21 to which is attached a handle 22. The forked ends 17 of the arms 16 each engage with a groove 23 in a hub-like member 24, in which is positioned and held rings of friction material 25 of leather or some other suitable composition. These hubs 24 are arranged to slide up and down upon the stems 14 and have a spline connection with said stem, so that although they are capable of sliding longitudinally thereof, they are rotated in unison. Attached to the lower end of each of the stems 14 is a beveled pinion 26 meshing with a beveled gear 27 which is keyed or otherwise secured to a sleeve 28 surrounding the drive shaft 8.

The sleeve 28 is keyed at its outer end to a cup-shaped member 29, so that this member is rotated simultaneously with said sleeve. Within this cup-shaped member is arranged companion semi-circular arms 30, best shown, perhaps, in Fig. 3. These arms are pivoted together as at 31 and between the free ends of said arms extends the end of a pin 32, Figs. 1 and 3, which end 33, as shown in Fig. 3, is made rectangular. This end, as stated, is arranged to lie between the free ends of the arms 30, and it is obvious that as the pin 32 is turned, the effect of turning the rectangular end thereof, will be to spread the arms 31 apart effecting a friction connection between these arms and the inner wall of the cup-shaped member 29. The pin 32 is mounted in a plate 34, and this plate in turn is formed with a sleeve 35 which is keyed to the driven shaft 36 so that through this connection a movement is imparted from the driving sleeve 28 to the driven shaft 36.

When the device is being used to transmit any speed forward other than a direct drive and also during the transmission of a reverse drive the connection is from the friction devices in the casing 11 through the sleeve 28, to the cup-shaped member 29, through the plate 34 and sleeve 35, to the shaft 36. With the parts in the position shown in Fig. 1, the friction devices within the casing 11 are in neutral position. The means for moving said devices into operative position consists of a sleeve 37 to which is attached arms 38 and 39 in turn connected to a lever member 40 having a handle 41. By actuating the handle 41 the sleeve 37 is moved in and out which in turn moves all of the friction devices within the casing 11. This will be clearly understood by referring to Fig. 1, where it is seen that the sleeve 37 terminates in a housing or casing 42, through which the stems 14 project, and the moving of the sleeve 37 and the housing 42 will obviously carry the stems and the rest of the friction devices toward the inner wall 43 or the inner wall 44 of the casing 11. The gear 27, of course, is moved at the same time so that the connection between the pinions 26 and gear 27 is at all times maintained.

Now assuming the sleeve 37 is moved to bring the transmission devices into position where the leather rings 35 will engage the inner wall 43 of the casing 11, this will rotate the said rings in a clock-wise direction and by reason of their connections with the stems 14 said stems will be rotated in a similar direction. The pinions 26 will thus be rotated, rotating the gears 27 and the sleeve 28, which latter in turn will rotate the cup-like member 29 and through the medium of the arms 30 and the plate 34, the shaft 36 will be rotated. The arms 38 and 39 are employed so that a dead center and lock will be established for the lever 41.

As is well known in friction transmission mechanisms, the farther the friction devices are placed from the center of rotation of the drive shaft the faster will be the speed transmitted to the driven shaft. In the present invention this is accomplished by manipulation of the lever 22. As said lever is manipulated it will turn the webbed ring 20, whereby the rollers 18 will be forced upward in the slot 19, swinging the arms 16 about their pivotal center, carrying the forked end thereof upward, sliding the hubs 24 and friction rings 25 upward on the stems 14 and bringing the said rings farther away from the center of rotation of the shaft 8 whereby they are revolved a greater number of times by a single revolution of the member 11, or in other words, a single revolution of the drive shaft, and hence a greater speed imparted to the shaft 36. By this means any desired speed of rotation of which the mechanism is capable can be transmitted from the driving to the driven shaft. When it is desired to reverse the drive the lever 41 is thrown over and by reason of its connection with the sleeve 37, said sleeve will be slid, bringing the rings 25 of the friction device against the wall 44 of the casing 11 and thus reversing the direction of movement of the hubs 24, the stems 14, pinions 26, gear 27, sleeve 28, member 29, plate 34 and driven shaft 36.

The foregoing, it is believed, clearly explains the manner in which a reverse drive, or any forward drive, save a direct, is transmitted from the drive shaft to the driven shaft. When it is desirable to make a direct drive from the driving to the driven shaft the friction gearing is placed in neutral position which is the position shown in Fig. 1, so that there is no movement transmitted through this device to the driven shaft. A sliding collar 45 is mounted to slide on the shaft 36, as shown in Fig. 1. This collar may be actuated by any suitable sort of lever mechanism and carries a plurality of pins 46 having their ends beveled on one side as at 47. These pins slide through the plate 34 and engage with pins 48 having their ends 49 beveled at one side, the pins 48 are mounted in a collar 50 keyed to the shaft 8. When the collar 45 is pushed inward the pins 46 and 48 will come into a locking or clutch engagement and since the collar 50 is being revolved by the shaft 8 there will obviously be a rotating movement imparted to the plate 34 and since the sleeve 35 of this plate is keyed to the shaft 36 a direct driving movement will be imparted from the shaft 8 to the shaft 36. During this direct drive no movement should be imparted to the cup-shaped member 29, and to explain how this is accomplished it is necessary to refer back again to the pivoted arms 30, which effect the connection between the cup-shaped member 29 and the plate 34, it will be remembered that connection between these parts is made by springing out the arms 30 by turning the head 33 on the stem 32. This stem and head are turned through the medium of an arm 51 extending from the stem and resting against the sliding collar 45. This collar is provided with a beveled surface 52 and when the sleeve 45 is pulled outward the end 53 (see Fig. 3) of the arm 41 will ride up on this beveled surface swinging this arm outward from the center of the shaft 36, turning the stem 32 and the head 33 spreading the arms 30 apart and thus effecting the connection between the cup-shaped member 29 and the plate 34, but when the sleeve 45 is forced inward to effect the direct drive connection the arm 51 passes off from the beveled surface 52 moving the stem 32 and head 33 into position where the arms 30 are collapsed, and the connection broken between the cup-shaped member 29 and the plate 34. Therefore by means of this auxiliary clutch mechanism it is possible to establish a direct drive from the driving to the driven shafts in a simple and easy manner, and with no interference from the friction devices which impart the reverse and forward speeds to the driven shaft.

The mechanism is compact and simple and is easy of operation, it being necessary to supply only three levers for actuating the entire device.

Although it is preferable to throw the friction devices into neutral before making the direct drive connection, this is not essential since when the arms 30 are collapsed no movement will be imparted from the friction devices to the shaft 36 and the direct drive will not be interfered with.

I claim:

1. In a device of the class described, the combination of a driving shaft and a driven shaft, friction devices interposed between the driving and driven shafts, a connection between the friction devices and driven shaft comprising a hollow member connected to said friction devices and a member connected to the driven shaft, means for establishing a connection between said hollow member and the member connected to the driven shaft, a member connected to the driving shaft, and means for breaking the connection between the hollow member and the member connected to the driven shaft and for establishing connection between the member connected to the driving shaft and the member connected to the driven shaft whereby a direct drive is effected, substantially as described.

2. In a device of the class described, the combination of a driving shaft and a driven shaft, friction devices interposed between the driving and driven shafts, a hollow member actuated by said friction devices, a member connected to the driven shaft, friction means for establishing a connection between the hollow member and the member connected to the driven shaft, a member connected to the driving shaft, and means for breaking the friction connection between the hollow member and the member connected to the driven shaft and for establishing connection between the member connected to the driving shaft and the member connected to the driven shaft whereby a direct drive is effected, substantially as described.

3. In a device of the class described, the combination of a driving shaft and a driven shaft, friction devices actuated by the driving shaft, a connection between the friction devices and driven shaft comprising a hollow member, pivoted arms within the hollow member, a member connected to the driven shaft, a connection between said arms and said member connected to the driven shaft, means for spreading and collapsing said arms to make and break a connection between the hollow member and member connected to the driven shaft, a member connected to the driving shaft, and means for effecting a connection between the member connected to the driving shaft and the member connected to the driven shaft whereby a direct drive is effected, substantially as described.

4. In a device of the class described, the combination of a driving shaft and a driven shaft, friction devices interposed between said driving and driven shafts, means for transmitting movement from said friction devices to the driven shaft comprising a hollow member, an expansible part within said hollow member, means for expanding and contracting said expansible part, a member connected to the driven shaft, a connection between said expansible part and said member, a member connected to the driving shaft, and means for effecting a connection between the member connected to the driving shaft and the member connected to the driven shaft whereby a direct drive is effected, substantially as described.

5. In a device of the class described, the combination of a driving shaft and a driven shaft, friction devices actuated by the driving shaft comprising oppositely disposed plates, a series of rotatable friction members lying between said plates and rotated by engagement with the inner wall of one of said plates, a sleeve, a connection between said rotated members and said sleeve, a connection between said sleeve and the driven shaft, and means for shifting said rotated member from engagement with the wall of one plate to engage with the wall of the other plate whereby the direction of rotation is reversed, substantially as described.

6. In a device of the class described, the combination of a driving shaft and a driven shaft, friction devices actuated by the driving shaft comprising oppositely disposed plates, a series of rotatable friction members lying between said plates and rotated by engagement with the inner wall of one of said plates, a sleeve, a connection between said rotated members and said sleeve, a connection between said sleeve and driven shaft, means for moving said rotated members in and out from the center of the driving shaft to vary the speed transmitted to the driven shaft, and means for shifting said rotated members from engagement with one of said plates and into engagement with the other of said plates whereby the direction of rotation is reversed, substantially as described.

7. In a device of the class described, the combination of a drive shaft and a driven shaft, friction devices actuated by the drive shaft including a casing, a series of rotatable stems radially extending within said casing, a friction disk on each stem actuated by engagement with an inner wall of the casing, a sleeve, a connection between the sleeve and driven shaft, a connection between the stems and sleeve, and means for shifting said disks from engagement with one inner wall of the casing into engagement with the opposite inner wall to reverse the direction of rotation of said disks, substantially as described.

8. In a device of the class described, the combination of a driving shaft and a driven shaft, friction devices actuated by the driving shaft including a casing, a series of rotatable stems radially extending within said casing, a friction disk on each stem actuated by engagement with an inner wall of the casing, a sleeve, a connection between the sleeve and driven shaft, a connection between the stems and sleeve, means for sliding said friction disks longitudinally of said stems to move them in and out from the center of the casing and vary the speed of rotation of said disks, and means for shifting said disks from engagement with one inner wall of the casing into engagement with the opposite inner wall to reverse the direction of rotation of said disks, substantially as described.

9. In a device of the class described, the combination of a driving shaft and a driven shaft, friction devices actuated by the driving shaft comprising oppositely disposed plates, a series of rotatable friction members within the casing and rotated by engagement with the inner face of one of said plates, a sleeve, a connection between said rotated members and sleeve, a connection between said sleeve and the driven shaft, and means for disconnecting the connection between said sleeve and driven shaft and effecting a direct connection between the driving and driven shafts, substantially as described.

10. In a device of the class described, the combination of a driving shaft and a driven shaft, friction devices actuated by the driving shaft including oppositely disposed plates, a series of rotatable stems radially extending between said plates, a friction disk on each stem rotated by engagement with the inner wall of one of said plates, a sleeve, a connection between the sleeve and driven shaft, a connection between the stems and sleeve, and means for disconnecting the connection between said sleeve and driven shaft and effecting a direct connection between the driving and driven shafts, substantially as described.

11. In a device of the class described, the combination of a driving shaft and a driven shaft, friction devices for transmitting power from the driving to the driven shafts comprising a casing rotated by the drive shaft, a ring within said casing, a series of stems mounted to revolve in said ring and radially extending from the drive shaft, a rotatable friction disk keyed to each stem and rotated by engagement with an inner wall of the casing, a sleeve extending at right angles to said stems, a driving connection between said stems and sleeve, and a connection between the driven shaft and sleeve, substantially as described.

12. In a device of the class described, the combination of a driving shaft and a driven shaft, friction devices for transmitting power from the driving to driven shafts comprising a casing rotated by the driving shaft, a ring within said casing, a series of stems mounted to revolve in said ring and radially extending from the driving shaft, a rotatable friction disk splined to each stem and rotated by engagement with an inner wall of the casing, a sleeve extending at right angles to said stems, a driving connection between said stems and sleeve, a connection between the driven shaft and sleeve, and means for breaking the connection between said sleeve and driven shaft and establishing a direct connection between said driving and driven shafts, substantially as described.

13. In a device of the class described, the combination of a driving shaft and a driven shaft, friction devices for transmitting power from the driving to driven shafts comprising a casing rotated by the driving shaft, a ring within said casing, a series of stems mounted to revolve in said ring and radially extending from the driving shaft, a rotatable friction disk splined to each stem and rotated by engagement with an inner wall of the casing, a sleeve extending at right angles to said stems, a driving connection between said stems and sleeve, a connection between the driven shaft and sleeve, and means for shifting said ring, stems and friction disks together with the connection between said sleeve and stems to bring the friction disks out of engagement with one wall of the casing and into engagement with an opposite wall to reverse the direction of drive, substantially as described.

14. In a device of the class described, the combination of a driving shaft and a driven shaft, a casing connected to the driving shaft, a series of rotatable stems within said casing, a rotatable friction disk splined to each stem and rotated by engagement with an inner wall of the casing, a sleeve extending at right angles to said stems, a driving connection between said stems and sleeve, a connection between the driven shaft and sleeve, a webbed plate within the casing, a connection between said webbed plate and friction disk whereby said plate when shifted forces the disks longitudinally of said stems, substantially as described.

15. In a device of the class described, the combination of a driving shaft and a driven shaft, a casing connected to the driving shaft, a series of rotatable stems within said casing, a rotatable friction disk splined to each stem and rotated by engagement with an inner wall of the casing, a sleeve extending at right angles to said stems, a driving connection between said stems and sleeve, a connection between the driven shaft and sleeve, a webbed plate within the casing, a connection between said webbed plate and friction disks whereby said plate when shifted forces the disks longitudinally of said stem, and means for breaking the connection between said sleeve and driven shaft and for establishing a direct connection between said driving and driven shafts, substantially as described.

16. In a device of the class described, the combination of a driving shaft and a driven shaft, a casing connected to the driving shaft, a series of rotatable stems within said casing, a rotatable friction disk splined to each stem and rotated by engagement with an inner wall of the casing, a sleeve extending at right angles to said stems, a driving connection between said stems and sleeve, a connection between the driving shaft and sleeve, a webbed plate within the casing, a connection between said webbed plate and friction disks whereby said plate when shifted forces the disks longitudinally of said stems, and means for reversing the direction of rotation of said friction disks, substantially as described.

17. In a device of the class described, the combination of a driving shaft and a driven shaft, a casing connected to the driving shaft, a series of rotatable stems within the casing, a rotatable friction disk splined to each stem, and rotated by engagement with an inner wall of the casing, means for sliding said disks longitudinally of said stems comprising a pivoted arm connected to each of said disks, a shiftable plate having a series of cam slots therein, a member extending from each of said arms one member lying within each of said slots, a sleeve extending at right angles to said stems, a driving connection between said stems and sleeve, and a connection between said sleeve and driven shaft, substantially as described.

18. In a device of the class described, the combination of a driving shaft and a driven shaft, a casing connected to the driving shaft, a series of rotatable stems within the casing, a rotatable friction disk splined to each stem and rotated by engagement with an inner wall of the casing, means for sliding said disks longitudinally of said stems comprising a pivoted arm connected to each of said disks, a shiftable plate having a series of cam slots therein, a member extending from each of said arms one member lying within each of said slots, a sleeve extending at right angles to said stems, a driving connection between said stems and sleeve, a connection between said sleeve and driven shaft, and means for breaking the connection between said sleeve and driven shaft and effecting a direct connection between said driving and driven shafts, substantially as described.

19. In a device of the class described, the combination of a driving shaft and a driven shaft, a casing connected to the driving shaft, a series of rotatable stems within the casing, a rotatable friction disk splined to each stem, and rotated by engagement with an inner wall of the casing, means for sliding said disks longitudinally of said stems comprising a pivoted arm connected to said disks, a shiftable plate having a series of cam slots therein, a member connected to each of said arms one member lying within each of said slots, a sleeve extending at right angles to said stems a driving connection between said stems and sleeve, a connection between said sleeve and driven shaft, and means for effecting a reverse movement of the friction disks, substantially as described.

20. In a device of the class described, the combination of a driving shaft and a driven shaft, a casing secured to the driving shaft, rotatable friction members within said casing rotated by engagement with an inner wall of the casing, a connection between said friction members and the driven shaft, a slidable sleeve, a connection between said friction members and said sleeve whereby when said sleeve is slid said friction members are brought out of engagement with one inner wall of the casing and into engagement with an opposite inner wall whereby the movement of said friction members are reversed, and means for breaking the connection between the friction devices and the driven shaft and establishing a direct connection between the driving and driven shafts, substantially as described.

WILMER G. BUCK.

Witnesses:
 FRANK ELLIOTT,
 HENRY HILL.

Copies of this patent may be obtained for five cents each, by addressing the "Commissioner of Patents, Washington, D. C."